United States Patent
Lee et al.

(10) Patent No.: US 7,655,306 B2
(45) Date of Patent: Feb. 2, 2010

(54) OPTICAL FILM, OPTICAL FILTER AND DISPLAY DEVICE INCLUDING THE SAME

(75) Inventors: Byoung Hoo Lee, Seoul (KR); Kyoung Ku Kang, Seoul (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 14 days.

(21) Appl. No.: 11/790,589

(22) Filed: Apr. 26, 2007

(65) Prior Publication Data

US 2007/0275184 A1 Nov. 29, 2007

(30) Foreign Application Priority Data

May 23, 2006 (KR) .................. 10-2006-0046129
Oct. 2, 2006 (KR) .................. 10-2006-0097124

(51) Int. Cl.
B32B 27/08 (2006.01)
B32B 27/20 (2006.01)
B32B 27/32 (2006.01)
B32B 27/36 (2006.01)
B32B 27/40 (2006.01)

(52) U.S. Cl. .............. 428/412; 428/413; 428/423.1; 428/424.2; 428/424.6; 428/424.8; 428/447; 428/473.5; 428/474.4; 428/475.2; 428/476.3; 428/480; 428/483; 428/522; 428/523; 359/885

(58) Field of Classification Search ............... None
See application file for complete search history.

(56) References Cited

U.S. PATENT DOCUMENTS

| | | | | |
|---|---|---|---|---|
| 3,482,972 A | * | 12/1969 | Idelson | 430/243 |
| 3,486,897 A | * | 12/1969 | Leech | 430/522 |
| 5,853,992 A | * | 12/1998 | Glazer et al. | 435/6 |
| 5,932,721 A | * | 8/1999 | Yashiro et al. | 540/139 |
| 6,157,504 A | * | 12/2000 | Yamada et al. | 359/885 |
| 6,255,031 B1 | | 7/2001 | Yao et al. | |
| 6,302,924 B1 | * | 10/2001 | Etzbach et al. | 8/466 |
| 6,307,671 B1 | * | 10/2001 | Yabuki | 359/361 |
| 6,309,564 B1 | * | 10/2001 | Harada et al. | 252/587 |
| 6,522,463 B1 | | 2/2003 | Shimomura et al. | |
| 6,531,230 B1 | * | 3/2003 | Weber et al. | 428/480 |
| 6,532,120 B1 | * | 3/2003 | Harada et al. | 359/885 |
| 6,586,057 B1 | * | 7/2003 | Yabuki | 428/1.1 |
| 6,597,525 B2 | * | 7/2003 | Kubota | 359/885 |
| 6,713,227 B2 | * | 3/2004 | Machiguchi et al. | 430/270.1 |
| 6,733,934 B2 | * | 5/2004 | Machiguchi et al. | 430/7 |
| 6,770,405 B2 | * | 8/2004 | Ueda et al. | 430/7 |
| 6,821,691 B2 | * | 11/2004 | Machiguchi et al. | 430/7 |
| 6,836,383 B1 | | 12/2004 | Ozawa et al. | |

(Continued)

FOREIGN PATENT DOCUMENTS

JP 10-139997 5/1998

(Continued)

*Primary Examiner*—Vivian Chen
(74) *Attorney, Agent, or Firm*—Lee & Morse, P.C.

(57) ABSTRACT

An optical film includes a selective visible light-absorbing layer including at least one dye having a maximum absorption wavelength in a range of about 470 nm to about 510 nm, the selective visible light-absorbing layer having a maximum light transmittance of about 60% or less at the maximum absorption wavelength of the dye and a full width at half maximum of about 50 nm or less.

17 Claims, 2 Drawing Sheets

| U.S. PATENT DOCUMENTS | | | |
|---|---|---|---|
| 6,864,022 B2 * | 3/2005 | Machiguchi et al. | 430/7 |
| 7,078,437 B2 * | 7/2006 | Akiba et al. | 514/560 |
| 2005/0186421 A1 * | 8/2005 | Choi et al. | 428/355 AC |

FOREIGN PATENT DOCUMENTS

| JP | 2000-027543 | | 1/2000 |
|---|---|---|---|
| JP | 2002-333517 | * | 11/2002 |
| KR | 2000-0005531 | | 1/2000 |
| KR | 2004-0020982 | | 3/2004 |
| KR | 10-2005-0121492 A | | 12/2005 |

* cited by examiner

Type 1                    Type 2

OPTICAL FILM, OPTICAL FILTER AND DISPLAY DEVICE INCLUDING THE SAME

BACKGROUND OF THE INVENTION

1. Field of the Invention

Embodiments of the present invention relate to an optical film, an optical filter, and a display device including the same. More particularly, embodiments of the present invention relate to an optical film including a selective visible light-absorbing layer that absorbs light in a wavelength range of about 470 nm to about 510 nm, an optical filter, and a display device including the same.

2. Description of the Related Art

Flat panel displays (FPDs), e.g., liquid crystal displays, plasma displays, electroluminescent displays, field emission displays, and vacuum fluorescent displays, may be manufactured to have a large area while being thin, and are therefore desirable. However, some FPDs, e.g., plasma displays, may emit a large amount of near infrared light. For example, in a plasma display, when UV light is produced using a discharge gas to excite a phosphor, near infrared light may be generated. Near infrared light may cause malfunctions of various electronic devices that use near infrared light, e.g., remote controls of appliances, devices that use near infrared communication, etc. Further, displays which generate a discharge in a discharge gas containing neon, e.g., plasma displays, may emit orange neon light having a wavelength of about 585 nm. Such light may undesirably decrease the purity of green and red colors emitted by the display. Further, yellow light, which may be emitted by the discharge gas in the wavelength range of about 470 nm to about 510 nm, may deteriorate the purity of blue and green colors in the display. Such reductions in color purity may undesirably reduce the image quality of the display.

SUMMARY OF THE INVENTION

The present invention is therefore directed to an optical film, an optical filter, and a display device including the same, which substantially overcome one or more of the problems due to the limitations and disadvantages of the related art.

It is therefore a feature of an embodiment of the present invention to provide an optical film that is configured to selectively filter yellow light in a range of about 470 nm to about 510 nm, and an optical filter and a display device including the same.

It is therefore another feature of an embodiment of the present invention to provide an optical film that is configured to increase color purity and color reproducibility by selectively filtering visible light of a predetermined wavelength that is emitted by a display device.

At least one of the above and other features and advantages of the present invention may be realized by providing an optical film, including a selective visible light-absorbing layer including at least one dye having a maximum absorption wavelength in a range of about 470 nm to about 510 nm, the selective visible light-absorbing layer having a maximum light transmittance of about 60% or less at the maximum absorption wavelength of the dye and a full width at half maximum of about 50 nm or less.

The selective visible light-absorbing layer may have a maximum light transmittance of 50% or less at the maximum absorption wavelength. The dye may have a maximum absorption wavelength in the range of about 485 nm to about 495 nm. The dye may be a cyanine dye. The cyanine dye may include one or more of a cyanine compound, a phthalocyanine compound, or a naphthalocyanine compound.

The selective visible light-absorbing layer may further include a color compensating dye, and the color compensating dye may include one or more of an anthraquinone dye, a perinone dye, a monoazo dye, a disazo dye, or a methine dye. The at least one color compensating dye may include a compound represented by one of Formulas 1 to 7 below:

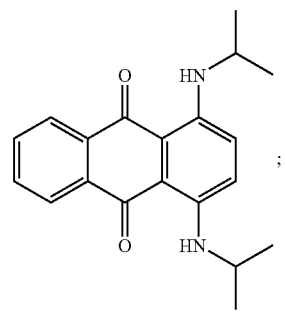

Formula 1

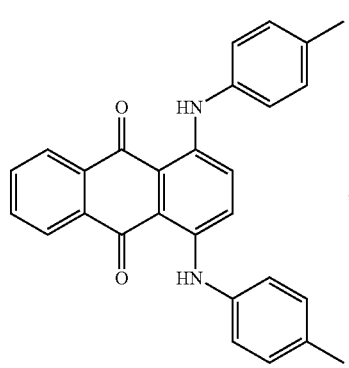

Formula 2

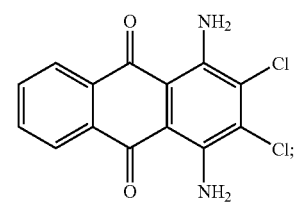

Formula 3

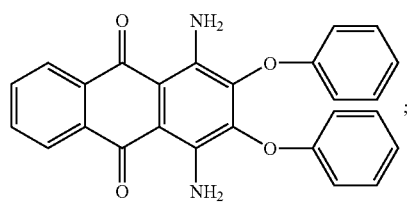

Formula 4

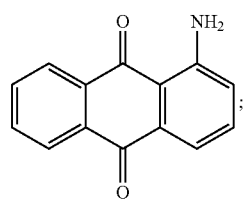

Formula 5

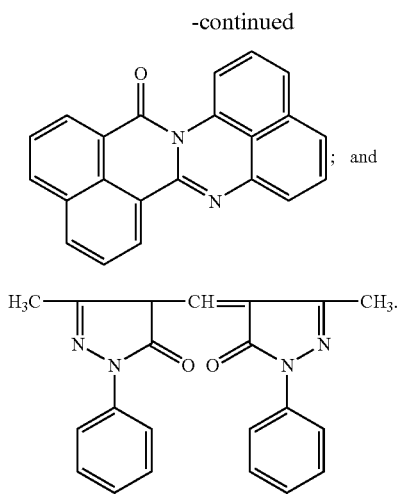

Formula 6

Formula 7

The selective visible light-absorbing layer may include about 0.0001 to about 30 parts by weight of the color compensating dye, based on 100 parts by weight of a solid content of the selective visible light-absorbing layer. The selective visible light-absorbing layer may include about 0.0001 to about 20 parts by weight of the dye and may further include about 10 to about 90 parts by weight of a binder resin, based on 100 parts by weight of a solid content of the selective visible light-absorbing layer.

The binder resin may include one or more of a melamine resin, a urethane resin, an epoxy resin, a polyester resin, a polyether resin, a polyimide resin, a silicone resin, or an acrylic resin.

The visible light-absorbing layer may be formed on a transparent substrate. The transparent substrate may include one or more of polyethylene terephthalate, polyethylene naphthalate, cyclic polyolefin, polyethylene, polypropylene, polystyrene, polyvinyl chloride, polyvinylidene chloride, polycarbonate, acrylic resin, triacetylcellulose, polyethersulfone, or polyetherketone. The selective visible light-absorbing layer may be formed by applying a coating solution including the dye, a binder resin, and a solvent on the transparent substrate.

At least one of the above and other features and advantages of the present invention may also be realized by providing an optical film including at least one layer, wherein the layer includes at least one dye having a maximum absorption wavelength in a range of about 470 nm to about 510 nm, and the layer has a maximum light transmittance of about 60% or less at the maximum absorption wavelength of the dye and a full width at half maximum of about 50 nm or less.

The dye may be a cyanine dye. The cyanine dye may include one or more of a cyanine compound, a phthalocyanine compound, or a naphthalocyanine compound.

At least one of the above and other features and advantages of the present invention may further be realized by providing a display device, including an optical filter having at least one layer, wherein the layer includes at least one dye having a maximum absorption wavelength in a range of about 470 nm to about 510 nm, and the layer has a maximum light transmittance of about 60% or less at the maximum absorption wavelength of the dye and a full width at half maximum of about 50 nm or less. The dye may be a cyanine dye. The display device may further include a plasma display panel. The display device may be configured to emit visible light using a discharge gas including neon.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DESCRIPTION OF THE INVENTION

Figure 1:
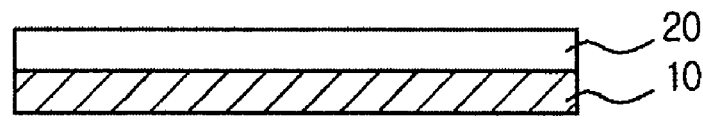
FIG. 1 illustrates a schematic sectional view of an optical film according to an embodiment of the present invention.

Korean Patent Application No. 10-2006-0046129, filed on May 23, 2006, and Korean Patent Application No. 10-2006-0097124, filed on Oct. 2, 2006, each of which is entitled: "Optical Film, Optical Filter and Display Device Comprising the Same," are incorporated by reference herein in their entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a schematic sectional view of an optical film according to an embodiment of the present invention. As illustrated in FIG. 1, the optical film may include a selective visible light-absorbing layer 20. In an implementation, the selective visible light-absorbing layer 20 may be formed on a transparent film 10. The selective visible light-absorbing layer 20 may be prepared by applying a coating solution on the transparent substrate 10, the coating solution including at least one dye (hereinafter referred to as a "selective visible light-absorbing dye") having a maximum absorption wavelength in the range of about 470 nm to about 510 nm. The selective visible light-absorbing dye may be dissolved or dispersed in a binder solution including, e.g., a binder resin and a solvent.

The selective visible light-absorbing dye may have a maximum absorption wavelength in the range of about 470 nm to about 510 nm. In an implementation, the selective visible light-absorbing dye may have a maximum absorption wavelength in the range of about 485 nm to about 495 nm. In an implementation, the selective visible light-absorbing dye may be a cyanine dye. The cyanine dye may include, e.g., a cyanine compound, a phthalocyanine compound, a naphthalocyanine compound, etc. More specifically, examples of the cyanine dye include, e.g., GPX 102 and GPX 201, available from Asahi Denka Co., Ltd., and NK-4271 and NK-7803, available from Hayashibara Biochemical Labs, Inc.

In an implementation, the selective visible light-absorbing layer 20 may have a maximum light transmittance of about 60% or less at the maximum absorption wavelength. When the maximum light transmittance at the maximum absorption wavelength exceeds about 60%, yellow light, which decreases color purity, may not be sufficiently absorbed. In an implementation, the selective visible light-absorbing layer 20 may have a maximum light transmittance of 50% or less at the maximum absorption wavelength. The maximum light transmittance of the selective visible light absorbing-layer 20 may be controlled by, e.g., controlling the amount of selective visible light-absorbing dye in the selective visible light absorbing-layer 20, controlling the thickness of the selective visible light absorbing-layer 20, etc.

The selective visible light-absorbing layer 20 may have a full width at half maximum of about 50 nm or less. As used herein, the term "full width at half maximum" means the bandwidth between two points corresponding to half of the maximum transmittance on the curve showing the light transmittance of the optical film. The full width at half maximum of the selective visible light-absorbing layer 20 may be regulated by the amount of dyes to be used. As the amount of dyes is increased, the full width at half maximum of the selective visible light-absorbing layer 20 may increase.

In some applications, if the full width at half maximum of the selective visible light-absorbing layer 20 exceeds about 50 nm, the selective visible light-absorbing layer 20 may negatively affect visible red (R), green (G) and blue (B) light, e.g., where such light is realized by the excitation of respective red, green and blue phosphors. This may result in a decreased ability to represent vivid color, and the resolution of the display screen may be decreased.

It will also be appreciated that a full width at half maximum of less than about 10 nm may be impractical or expensive because it may be difficult to realize such a layer. Further, the difficulties and/or expense may not be warranted if relatively few advantages are provided by such a filter.

In an implementation, the selective visible light-absorbing layer 20 may include about 0.0001 to about 20 parts by weight, e.g., about 0.001 to about 10 parts by weight, of the selective visible light-absorbing dye, based on 100 parts by weight of the solid content of the selective visible light-absorbing layer 20.

In the selective visible light-absorbing layer 20, the binder resin may include one or more of, e.g., melamine resin, urethane resin, epoxy resin, polyester resin, polyether resin, polyimide resin, silicone resin, or acrylic resin, or a resin that is cured or dried using energy such as heat, UV light or other electromagnetic radiation, etc. In an implementation, the selective visible light-absorbing layer 20 may include about 10 to about 90 parts by weight of the binder resin, based on 100 parts by weight of the solid content of the selective visible light-absorbing layer 20.

The selective visible light-absorbing layer 20 may further include one or more color compensating dyes for compensating the color of the optical film, in addition to the selective visible light-absorbing dye. The color compensating dyes that are used may vary depending on the tone of color to be represented, and may include one or more of, e.g., an anthraquinone dye, a perinone dye, a monoazo dye, a disazo dye, or a methine dye. The color compensating dyes may include an anthraquinone compound represented by Formulas 1 to 5 below, a perinone compound represented by Formula 6 below, and a methine compound represented by Formula 7 below:

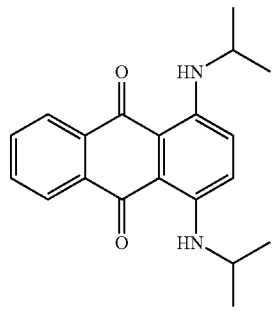

Formula 1

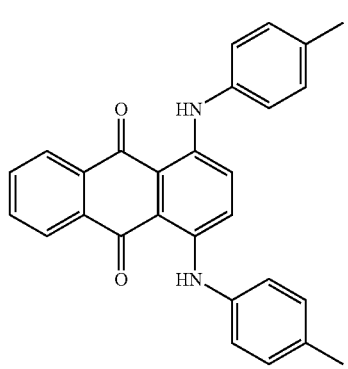

Formula 2

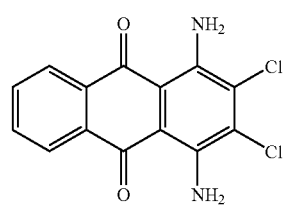

Formula 3

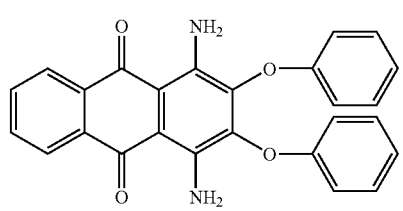

Formula 4

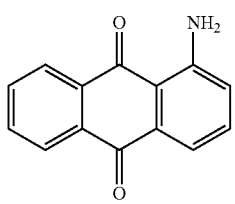

Formula 5

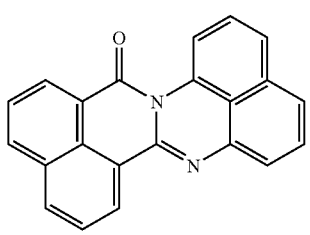

Formula 6

-continued

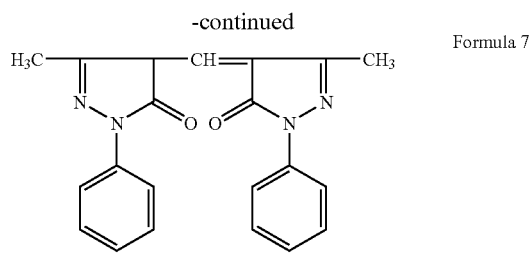

Formula 7

The anthraquinone dye may be, e.g., an aminoanthraquinone dye such as Green-5B, Blue-RR, Redvio-RV, Violet-R, or Green-G, available from M. Dohmen GmbH. The perinone dye may be, e.g., Red A2G, also available from M. Dohmen GmbH. The disazo dye may be, e.g., Black KB or Black K, also available from M. Dohmen GmbH, or Yellow 93 ($C_{21}H_{18}N_4O_2$), available from Jiangsu Yabang Dyestuffs Co., Ltd.

In the case where the selective visible light-absorbing layer 20 includes the color compensating dye, the color compensating dye may be used in an amount of about 0.0001 to about 30 parts by weight, e.g., about 0.001 to about 15 parts by weight, based on 100 parts by weight of the solid content of the selective visible light-absorbing layer 20. In an implementation, the thickness of the selective visible light-absorbing layer 20 may be in the range of about 1 μm to about 2 μm.

In the optical film according to this embodiment of the present invention, the transparent substrate 10 may function as a support for the selective visible light-absorbing layer 20 and is not particularly limited as long as it is transparent to visible light. The transparent substrate 10 may be, e.g., a film formed of polyester, such as polyethylene terephthalate (PET) or polyethylene naphthalate (PEN), polyolefin, such as cyclic polyolefin, polyethylene, polypropylene, or polystyrene, vinyl resin, such as polyvinyl chloride or polyvinylidene chloride, polycarbonate, acrylic resin, triacetylcellulose (TAC), polyethersulfone, or polyetherketone resin.

The optical film according to this embodiment of the present invention may be prepared using a general film-forming process. For example, the selective visible light-absorbing layer 20 may be formed by mixing the selective visible light-absorbing dye, the binder resin, and/or other additives, along with a solvent, and dissolving or dispersing the respective components to thus prepare a coating solution for the selective visible light-absorbing layer 20. The solution may then be applied on the transparent substrate 10 and cured/dried.

The solvent may include one or more of, e.g., a ketone compound such as methylethylketone (MEK), methylisobutylketone (MIBK), acetone, cyclohexanone, or cyclopentanone, an ether compound such as dioxolane, dioxane, or dimethoxyethane, and/or an aromatic compound such as toluene and xylene.

An antioxidant additive and/or a UV light absorbent additive may be added to increase the durability of the selective visible light-absorbing layer 20. Particular examples of the antioxidant additive include phenol, amine, hindered phenol, hindered amine, sulfur, phosphoric acid, phosphorous acid, and/or metal complexes. Particular examples of the UV light absorbent additive include benzophenone and benzotriazole.

In an implementation, the selective visible light-absorbing dye and the binder resin may be melted and kneaded along with the additive to thus prepare a coating solution, which may then be applied on the transparent substrate 10 by being extruded.

The process for applying the coating solution for a selective visible light-absorbing layer may include, e.g., spin coating, roll coating, Meyer bar coating, doctor blade coating, gravure coating, reverse gravure coating, kiss reverse coating, die coating, or comma coating. After the coating solution is applied, it may be dried at about 60° C. to about 120° C. for about 0.5 min to about 10 min in a dry oven to evaporate the solvent.

Figure 3:
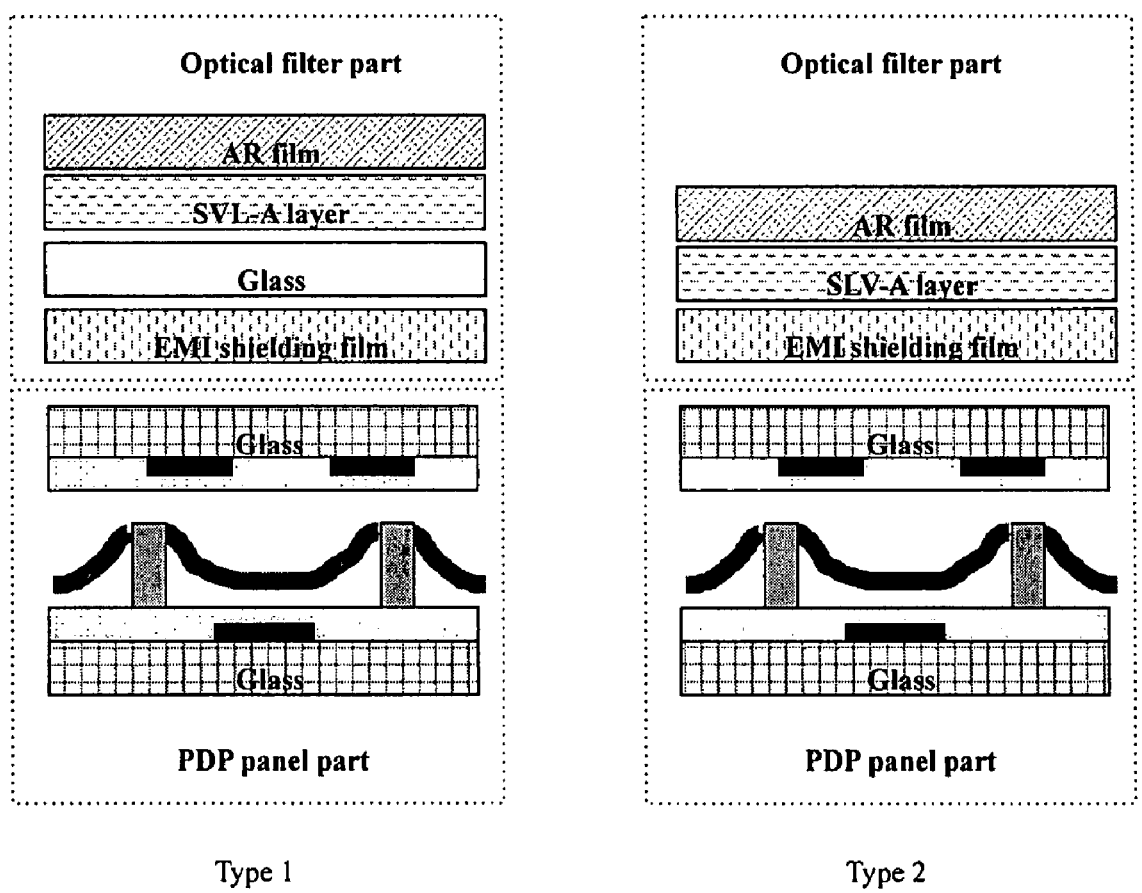
FIG. 3 illustrates a schematic sectional view of a display device according to an embodiment of the present invention.

An optical film according to an embodiment of the present invention may be included in an optical filter 30 for a display device 300, as illustrated in FIG. 3. The optical filter 30 according to this embodiment of the present invention may include the above-described film having the selective light-absorbing layer 20, and may further include one or more of, e.g., a near infrared light-absorbing layer, an electromagnetic wave blocking layer, a color compensating layer, a neon light blocking layer, an antifouling layer, an antireflective layer, or an adhesive layer. In an implementation, a composite layer performing a combination of the respective layer functions may be provided. For example, a single layer, which is able to block both near infrared light and neon light, may be included in the optical filter.

An optical film or an optical filter according to embodiments of the present invention may be included in a display device. Particular examples of the display device include, e.g., a plasma display device and a liquid crystal display device.

In a plasma display device according to an embodiment of the present invention, the above-described optical film or optical filter may be arranged at the front surface of the plasma display device. Visible light of about 470 nm to about 510 nm, generated upon light emission through electrical discharge using neon, xenon or other discharge gases, may be selectively absorbed by the optical film or optical filter. This may increase the color purity of light emitted by the plasma display device, in particular, the purity of blue and green colors. Further, color reproduction may also be increased, which may improve the image quality of the display device. Referring to FIG. 3, two exemplary types of plasma display devices are illustrated, the first type having an optical filter part that includes a glass layer below the selective visible light-absorbing layer and the second type having an optical filter part that omits the glass layer.

Particular implementations of embodiments of the present invention will now be described in the following examples. It will be appreciated that these examples are merely illustrative and are not to be construed as limiting the present invention thereto.

EXAMPLE 1

In Example 1, 0.03 g of a cyanine dye (GPX 201, available from Asahi Denka) was mixed with 31.97 g of methylethylketone, and then the mixture was stirred until the dye was completely dissolved, after which 68 g of an acrylic binder, Halshybrid IR-G 205, available from Nippon Shokubai Co., Ltd., was added thereto. The mixture was stirred to prepare a coating solution for a selective visible light-absorbing layer. The coating solution thus prepared was applied on a transparent substrate (PET film A4100, available from Toyobo Co., Ltd.) through spin coating, and was then dried at 80° C. for 1 min, thereby manufacturing an optical film. The thickness of the selective visible light-absorbing layer was 8 μm.

EXAMPLE 2

An optical film was manufactured in the same manner as in Example 1, with the exception that 0.05 g of a cyanine dye (GPX 201, available from Asahi Denka Co., Ltd.) and 0.16 g of an anthraquinone dye (Blue RR, available from M. Dohmen GmbH) were used along with 31.79 g of methylethylketone. The thickness of the selective visible light-absorbing layer was 8 μm.

COMPARATIVE EXAMPLE 1

An optical film was manufactured in the same manner as in Example 1, with the exception that a cyanine dye was not used, and 0.04 g of an anthraquinone dye (Blue RR, available from M. Dohmen GmbH), 0.02 g of a disazo dye (Black KB) and 0.03 g of a perinone dye (Yellow 93, available from Jiangsu Yabang Dyestuff Co., Ltd.) were used along with 31.91 g of a methylethylketone solvent. The thickness of the selective visible light-absorbing layer was 8 μm.

COMPARATIVE EXAMPLE 2

An optical film was manufactured in the same manner as in Example 1, with the exception that a cyanine dye was not used, and 0.4 g of a perinone dye (Red A2G, available from M. Dohmen GmbH) was used along with 31.6 g of a methylethylketone solvent. The thickness of the selective visible light-absorbing layer was 8 μm.

Measurement of Light Transmittance

Figure 2:
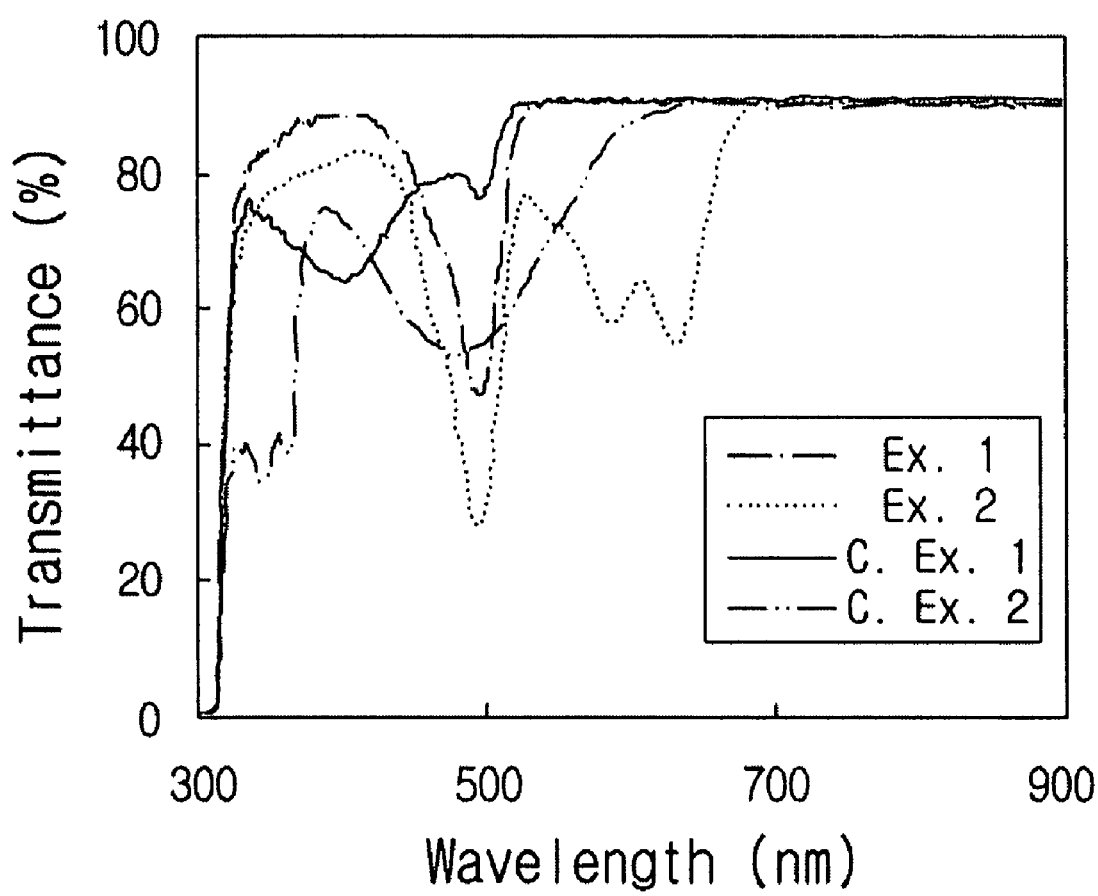
FIG. 2 illustrates a graph of light transmittance of an optical film according to an embodiment of the present invention and a comparative example.

The optical films manufactured in Examples 1 and 2 and Comparative Examples 1 and 2 were measured for light transmittance depending on wavelength using a spectrophotometer (Lambda 950, available from PerkinElmer, Inc.). The results are shown in FIG. 2. The maximum absorption wavelength in the specific range of about 470 nm to about 510 nm, the light transmittance at the maximum absorption wavelength, and the full width at half maximum (FWHM) are shown in Table 1 below.

TABLE 1

| | Max. Absorption (nm) | Transmittance at Max. Absorption | FWHM (nm) |
|---|---|---|---|
| Ex. 1 | 494 | 47 | 38 |
| Ex. 2 | 494 | 28 | 46 |
| C. Ex. 1 | 494 | 76 | 19 |
| I.E. | 496 | 53 | 119 |

As is apparent from Table 1, the optical films of the invention (Examples 1 and 2) had a maximum absorption wavelength in the range of about 470 nm to about 510 nm, light transmittance of about 60% or less at this maximum absorption wavelength, and FWHM of 50 nm or less.

FIG. 2 is a graph illustrating the above results. In the case of the optical films of the present invention (Examples 1 and 2), light of about 470 nm to about 510 nm could be seen to be selectively absorbed.

As described above, embodiments of the present invention provide an optical film, an optical filter, and a display device comprising the same. An optical film according to an embodiment of the present invention may selectively cut yellow light having a wavelength of about 470 nm to about 510 nm, such as light generated from the phosphor of a plasma display device. Thus, a display device including the optical film of the invention may exhibit good blue and green balance, and superior color reproduction.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An optical film, comprising a selective visible light-absorbing layer including at least one dye having a maximum absorption wavelength in a range of about 470 nm to about 510 nm, the selective visible light-absorbing layer having a maximum light transmittance of about 60% or less at the maximum absorption wavelength of the dye and a full width at half maximum of about 50 nm or less, wherein the dye includes a cyanine dye.

2. The optical film as claimed in claim 1, wherein the selective visible light-absorbing layer has a maximum light transmittance of 50% or less at the maximum absorption wavelength.

3. The optical film as claimed in claim 1, wherein the dye has a maximum absorption wavelength in the range of about 485 nm to about 495 nm.

4. The optical film as claimed in claim 1, wherein the cyanine dye includes one or more of a cyanine compound, a phthalocyanine compound, or a naphthalocyanine compound.

5. The optical film as claimed in claim 4, wherein:
the selective visible light-absorbing layer further includes a color compensating dye, and
the color compensating dye includes one or more of an anthraquinone dye, a perinone dye, a monoazo dye, a disazo dye, or a methine dye.

6. The optical film as claimed in claim 5, wherein the at least one color compensating dye includes a compound represented by one of Formulas 1 to 7 below:

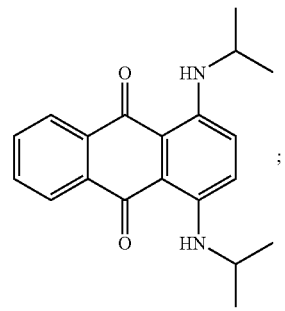

Formula 1

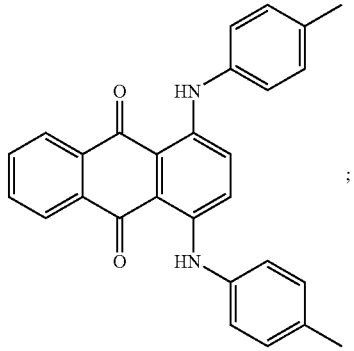

Formula 2

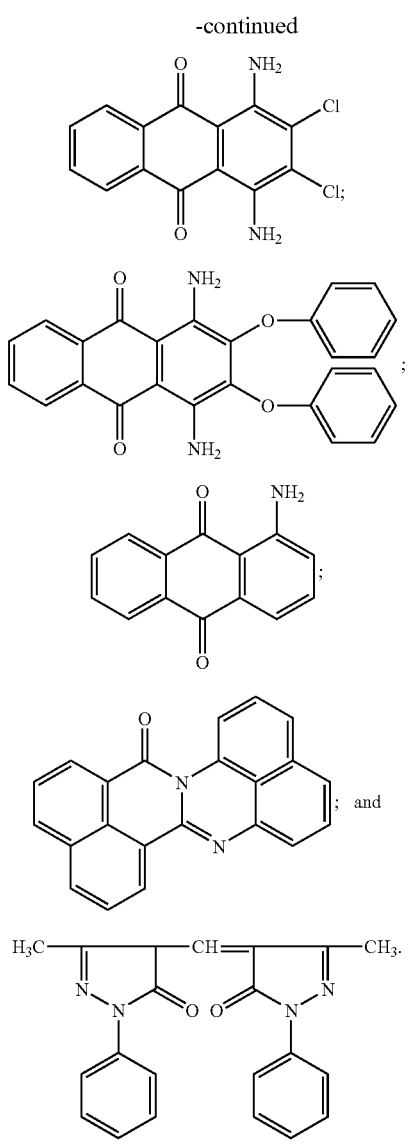

Formula 3

Formula 4

Formula 5

Formula 6

Formula 7

7. The optical film as claimed in claim 5, wherein the selective visible light-absorbing layer includes about 0.0001 to about 30 parts by weight of the color compensating dye, based on 100 parts by weight of a solid content of the selective visible light-absorbing layer.

8. The optical film as claimed in claim 1, wherein the selective visible light-absorbing layer includes about 0.0001 to about 20 parts by weight of the dye and further includes about 10 to about 90 parts by weight of a binder resin, based on 100 parts by weight of a solid content of the selective visible light-absorbing layer.

9. The optical film as claimed in claim 8, wherein the binder resin includes one or more of a melamine resin, a urethane resin, an epoxy resin, a polyester resin, a polyether resin, a polyimide resin, a silicone resin, or an acrylic resin.

10. The optical film as claimed in claim 1, wherein the visible light-absorbing layer is formed on a transparent substrate.

11. The optical film as claimed in claim 10, wherein the transparent substrate includes one or more of polyethylene terephthalate, polyethylene naphthalate, cyclic polyolefin, polyethylene, polypropylene, polystyrene, polyvinyl chloride, polyvinylidene chloride, polycarbonate, acrylic resin, triacetylcellulose, polyethersulfone, or polyetherketone.

12. The optical film as claimed in claim 10, wherein the selective visible light-absorbing layer is formed by applying a coating solution including the dye, a binder resin, and a solvent on the transparent substrate.

13. An optical filter, comprising at least one layer, wherein:
 the layer includes at least one dye having a maximum absorption wavelength in a range of about 470 nm to about 510 nm,
 the layer has a maximum light transmittance of about 60% or less at the maximum absorption wavelength of the dye and a full width at half maximum of about 50 nm or less, and
 the dye includes a cyanine dye.

14. The optical filter as claimed in claim 13, wherein the cyanine dye includes one or more of a cyanine compound, a phthalocyanine compound, or a naphthalocyanine compound.

15. A display device, comprising an optical filter having at least one layer, wherein:
 the layer includes at least one dye having a maximum absorption wavelength in a range of about 470 nm to about 510 nm,
 the layer has a maximum light transmittance of about 60% or less at the maximum absorption wavelength of the dye and a full width at half maximum of about 50 nm or less, and
 the dye includes a cyanine dye.

16. The display device as claimed in claim 15, further comprising a plasma display panel.

17. The display device as claimed in claim 16, wherein the display device is configured to emit visible light using a discharge gas including neon

* * * * *